United States Patent
Hummon et al.

(10) Patent No.: US 11,709,465 B2
(45) Date of Patent: *Jul. 25, 2023

(54) ORCHESTRATED ENERGY

(71) Applicant: Tendril OE, LLC, Boulder, CO (US)

(72) Inventors: Marissa Hummon, Boulder, CA (US); Patrick Sullivan, Boulder, CO (US); Brett Feldman, Boulder, CO (US)

(73) Assignee: Tendril OE, LLC, Boulder, CO (US)

( * ) Notice: Subject to any disclaimer, the term of this patent is extended or adjusted under 35 U.S.C. 154(b) by 288 days.

This patent is subject to a terminal disclaimer.

(21) Appl. No.: 17/115,681

(22) Filed: Dec. 8, 2020

(65) Prior Publication Data

US 2021/0294283 A1    Sep. 23, 2021

Related U.S. Application Data

(63) Continuation of application No. 15/476,857, filed on Mar. 31, 2017, now Pat. No. 10,866,568.
(Continued)

(51) Int. Cl.
*H02J 3/00*     (2006.01)
*G05B 15/02*   (2006.01)
*G06Q 10/04*   (2023.01)

(52) U.S. Cl.
CPC ............ *G05B 15/02* (2013.01); *G06Q 10/04* (2013.01); *H02J 3/003* (2020.01); *H02J 2203/20* (2020.01); *Y02E 60/00* (2013.01); *Y04S 40/20* (2013.01)

(58) Field of Classification Search
CPC ......... G05B 15/02; G06Q 10/04; H02J 3/003; H02J 2203/20; Y02E 60/00; Y04S 40/20
See application file for complete search history.

(56) References Cited

U.S. PATENT DOCUMENTS 4,042,013 A     8/1977   Demaray et al.
4,401,943 A     8/1983   Morris
(Continued)

FOREIGN PATENT DOCUMENTS

WO     0074306         12/2000
WO     2012068503 A1    5/2012
WO     2014085777 A1    6/2014

OTHER PUBLICATIONS

Ahmad et al. "Computational intelligence techniques for HVAC systems: A review." Building Simulation, Tsinghua University Press, vol. 9, No. 4, Mar. 31, 2016, pp. 359-398.
(Continued)

*Primary Examiner* — Mohammad Ali
*Assistant Examiner* — Vincent W Chang
(74) *Attorney, Agent, or Firm* — Perkins Coie LLP

(57) ABSTRACT

A facility providing systems and methods for managing and optimizing energy consumption and/or production is provided. The facility provides techniques for optimizing energy-consuming and energy-producing systems to meet specified demands or goals in accordance with various constraints. The facility relies on models to generate an optimization for an energy system. In order to use generic models to simulate and optimize energy consumption for an energy system, the generic models are calibrated to properly represent or approximate conditions of the energy system during the optimization period. After the appropriate models have been calibrated for a given situation using one or more modeling parameter sets, the facility can simulate inputs and responses for the corresponding system. The facility uses the generated simulations to generate a plan or control schedule to be implemented by the energy system during the optimization period.

18 Claims, 8 Drawing Sheets

Related U.S. Application Data

(60) Provisional application No. 62/317,426, filed on Apr. 1, 2016.

(56) References Cited

U.S. PATENT DOCUMENTS

| | | |
|---|---|---|
| 4,475,685 A | 10/1984 | Grimado et al. |
| 5,179,556 A | 1/1993 | Turner |
| 5,510,975 A | 4/1996 | Ziegler |
| 5,572,438 A | 11/1996 | Ehlers et al. |
| 5,684,710 A | 11/1997 | Ehlers et al. |
| 5,696,695 A | 12/1997 | Ehlers et al. |
| 5,719,861 A | 2/1998 | Okanoue |
| 5,865,991 A | 2/1999 | Hsu |
| 5,924,486 A | 7/1999 | Ehlers et al. |
| 5,949,976 A | 9/1999 | Chappelle |
| 5,959,529 A | 9/1999 | Kail |
| 6,028,857 A | 2/2000 | Poor |
| 6,092,207 A | 7/2000 | Kolinski et al. |
| 6,178,362 B1 | 1/2001 | Woolard et al. |
| 6,208,247 B1 | 3/2001 | Agre et al. |
| 6,216,956 B1 | 4/2001 | Ehlers et al. |
| 6,498,955 B1 | 12/2002 | Mccarthy et al. |
| 6,631,309 B2 | 10/2003 | Boies et al. |
| 6,640,248 B1 | 10/2003 | Jorgensen |
| 6,680,922 B1 | 1/2004 | Jorgensen |
| 6,684,339 B1 | 1/2004 | Willig |
| 6,754,504 B1 | 6/2004 | Reed |
| 6,785,592 B1 | 8/2004 | Smith et al. |
| 6,859,831 B1 | 2/2005 | Gelvin et al. |
| 6,947,483 B2 | 9/2005 | Engwer |
| 7,058,657 B1 | 6/2006 | Berno |
| 7,062,389 B2 | 6/2006 | Johnson et al. |
| 7,130,719 B2 | 10/2006 | Ehlers et al. |
| 7,171,287 B2 | 1/2007 | Weiss |
| 7,216,021 B2 | 5/2007 | Matsubara et al. |
| 7,245,947 B2 | 7/2007 | Salokannel et al. |
| 7,263,450 B2 | 8/2007 | Hunter |
| 7,266,428 B2 | 9/2007 | Alexanian |
| 7,302,634 B2 | 11/2007 | Lucovsky et al. |
| 7,333,821 B2 | 2/2008 | Willey |
| 7,356,548 B1 | 4/2008 | Culp et al. |
| 7,364,093 B2 | 4/2008 | Garozzo |
| 7,505,852 B2 | 3/2009 | Board |
| 7,539,488 B2 | 5/2009 | Friedman |
| 7,552,033 B1 | 6/2009 | Culp et al. |
| 7,769,611 B1 | 8/2010 | Rodriguez et al. |
| 7,775,454 B2 | 8/2010 | Mueller et al. |
| 7,966,104 B2 | 6/2011 | Srivastava et al. |
| 8,010,240 B2 | 8/2011 | Mattiocco et al. |
| 8,014,905 B2 | 9/2011 | Ehlers |
| 8,121,741 B2 | 2/2012 | Taft et al. |
| 8,175,756 B2 | 5/2012 | Musti et al. |
| 8,176,095 B2 | 5/2012 | Murray et al. |
| 8,239,046 B2 | 8/2012 | Koehler et al. |
| 8,265,776 B2 | 9/2012 | Osann |
| 8,301,921 B2 | 10/2012 | Goodnow et al. |
| 8,332,055 B2 | 12/2012 | Veillette |
| 8,510,255 B2 | 8/2013 | Fadell et al. |
| 8,515,878 B2 | 8/2013 | Radloff et al. |
| 8,543,251 B2 | 9/2013 | Plant |
| 8,549,335 B2 | 10/2013 | Goodnow et al. |
| 8,554,376 B1 | 10/2013 | Matsuoka et al. |
| 8,560,128 B2 | 10/2013 | Satterthwaite et al. |
| 8,583,531 B2 | 11/2013 | Hirl |
| 8,630,742 B1 * | 1/2014 | Stefanski ............... H05B 1/028 |
| | | 713/323 |
| 8,674,843 B2 | 3/2014 | Bhageria et al. |
| 8,730,057 B2 | 5/2014 | Dalla |
| 8,761,945 B2 | 6/2014 | Hadzidedic |
| 8,872,667 B2 | 10/2014 | Bhageria et al. |
| 8,892,264 B2 | 11/2014 | Steven et al. |
| 8,977,404 B2 | 3/2015 | Benes et al. |
| 9,003,343 B2 | 4/2015 | Zhou et al. |
| 9,007,077 B2 | 4/2015 | El-Essawy et al. |
| 9,026,261 B2 | 5/2015 | Bukhin et al. |
| 9,244,446 B2 | 1/2016 | Bhageria et al. |
| 9,256,908 B2 | 2/2016 | Dai et al. |
| 9,298,197 B2 | 3/2016 | Matsuoka et al. |
| 9,310,815 B2 | 4/2016 | Shiflet |
| 9,329,212 B2 | 5/2016 | Benes et al. |
| 9,423,779 B2 | 8/2016 | Agarwal |
| 9,471,718 B2 | 10/2016 | Bukhin et al. |
| 9,576,472 B2 | 2/2017 | Koch |
| 9,696,055 B1 | 7/2017 | Goodman et al. |
| 9,722,813 B2 | 8/2017 | Benes et al. |
| 9,785,129 B2 | 10/2017 | Bhageria et al. |
| 9,923,416 B2 | 3/2018 | Bhageria et al. |
| 10,007,243 B2 | 6/2018 | Bhageria et al. |
| 10,281,895 B2 | 5/2019 | Agarwal |
| 10,379,508 B2 | 8/2019 | Shiflet |
| 10,678,279 B2 | 6/2020 | Corbin |
| 10,697,662 B2 | 6/2020 | Matsuoka et al. |
| 10,708,077 B2 | 7/2020 | Cui et al. |
| 10,782,666 B2 | 9/2020 | Agarwal |
| 10,866,568 B2 | 12/2020 | Hummon et al. |
| 10,911,256 B2 | 2/2021 | Benes et al. |
| 11,042,141 B2 | 6/2021 | Shiflet |
| 11,149,975 B2 | 10/2021 | Knatchbull-Hugessen et al. |
| 2002/0002636 A1 | 1/2002 | Vange et al. |
| 2002/0071398 A1 | 6/2002 | Moran et al. |
| 2002/0158763 A1 | 10/2002 | Takarada et al. |
| 2003/0069970 A1 | 4/2003 | Kim et al. |
| 2003/0083758 A1 | 5/2003 | Williamson |
| 2003/0190912 A1 | 10/2003 | Jampolsky et al. |
| 2003/0191955 A1 | 10/2003 | Wagner et al. |
| 2003/0216837 A1 | 11/2003 | Reich et al. |
| 2003/0227439 A1 | 12/2003 | Lee et al. |
| 2004/0034684 A1 | 2/2004 | Payne |
| 2004/0117330 A1 | 6/2004 | Ehlers et al. |
| 2004/0133314 A1 | 7/2004 | Ehlers et al. |
| 2004/0138981 A1 | 7/2004 | Ehlers et al. |
| 2004/0139038 A1 | 7/2004 | Ehlers et al. |
| 2004/0249515 A1 | 12/2004 | Johnson et al. |
| 2004/0260411 A1 | 12/2004 | Cannon |
| 2004/0262410 A1 | 12/2004 | Hull |
| 2005/0038571 A1 | 2/2005 | Brickfield et al. |
| 2005/0043829 A1 | 2/2005 | Rossides |
| 2005/0055137 A1 | 3/2005 | Andren et al. |
| 2005/0060107 A1 | 3/2005 | Rodenberg et al. |
| 2005/0095978 A1 | 5/2005 | Blunn et al. |
| 2005/0096060 A1 | 5/2005 | Rajkotia et al. |
| 2005/0096857 A1 | 5/2005 | Hunter |
| 2005/0124358 A1 | 6/2005 | Willey |
| 2005/0125083 A1 | 6/2005 | Kiko |
| 2005/0157723 A1 | 7/2005 | Kim et al. |
| 2005/0171645 A1 | 8/2005 | Oswald et al. |
| 2006/0005046 A1 | 1/2006 | Hars |
| 2006/0143600 A1 | 6/2006 | Cottrell et al. |
| 2006/0200542 A1 | 9/2006 | Willig |
| 2006/0200658 A1 | 9/2006 | Penkethman |
| 2006/0209789 A1 | 9/2006 | Gupta et al. |
| 2006/0276938 A1 | 12/2006 | Miller |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0097993 A1 | 5/2007 | Bojahra et al. |
| 2007/0173978 A1 | 7/2007 | Fein et al. |
| 2007/0174644 A1 | 7/2007 | Willig |
| 2007/0239317 A1 | 10/2007 | Bogolea et al. |
| 2007/0251461 A1 | 11/2007 | Reichard et al. |
| 2008/0021749 A1 | 1/2008 | Hope |
| 2008/0065816 A1 | 3/2008 | Seo |
| 2008/0076346 A1 | 3/2008 | Ahmed et al. |
| 2008/0129495 A1 | 6/2008 | Hitt |
| 2008/0256445 A1 | 10/2008 | Ziff et al. |
| 2008/0263196 A1 | 10/2008 | Kansal et al. |
| 2008/0271123 A1 | 10/2008 | Ollis et al. |
| 2008/0277486 A1 | 11/2008 | Seem et al. |
| 2008/0300906 A1 | 12/2008 | Doi et al. |
| 2008/0306985 A1 | 12/2008 | Murray et al. |
| 2009/0007706 A1 | 1/2009 | Hitt et al. |
| 2009/0045256 A1 | 2/2009 | McInerney et al. |
| 2009/0059842 A1 | 3/2009 | Maltseff et al. |

(56) References Cited

U.S. PATENT DOCUMENTS

| | | | |
|---|---|---|---|
| 2009/0115597 A1 | 5/2009 | Giacalone | |
| 2009/0135018 A1 | 5/2009 | Veillette et al. | |
| 2009/0135836 A1 | 5/2009 | Veillette | |
| 2009/0320012 A1 | 12/2009 | Lee et al. | |
| 2010/0010678 A1 | 1/2010 | Dawson et al. | |
| 2010/0031324 A1 | 2/2010 | Strich et al. | |
| 2010/0042453 A1 | 2/2010 | Scaramellino et al. | |
| 2010/0042720 A1 | 2/2010 | Stienhans et al. | |
| 2010/0070101 A1 | 3/2010 | Benes et al. | |
| 2010/0070102 A1 | 3/2010 | Benes et al. | |
| 2010/0097225 A1 | 4/2010 | Petricoin | |
| 2010/0100253 A1 | 4/2010 | Fausak et al. | |
| 2010/0107112 A1 | 4/2010 | Jennings et al. | |
| 2010/0156665 A1 | 6/2010 | Krzyzanowski et al. | |
| 2010/0204834 A1 | 8/2010 | Comerford et al. | |
| 2010/0289643 A1 | 11/2010 | Trundle et al. | |
| 2011/0029341 A1 | 2/2011 | Muse et al. | |
| 2011/0032070 A1 | 2/2011 | Bleile | |
| 2011/0040785 A1 | 2/2011 | Steenberg et al. | |
| 2011/0046805 A1 | 2/2011 | Bedros et al. | |
| 2011/0144932 A1 | 6/2011 | Alles | |
| 2011/0166710 A1 | 7/2011 | Kordik et al. | |
| 2011/0227417 A1 | 9/2011 | Walker | |
| 2011/0231320 A1 | 9/2011 | Irving | |
| 2011/0251807 A1 | 10/2011 | Rada et al. | |
| 2011/0282808 A1 | 11/2011 | Amram et al. | |
| 2011/0289019 A1 | 11/2011 | Radloff et al. | |
| 2011/0313964 A1 | 12/2011 | Sanchey Loureda et al. | |
| 2012/0029717 A1 | 2/2012 | Cox et al. | |
| 2012/0031984 A1 | 2/2012 | Feldmeier et al. | |
| 2012/0053740 A1 | 3/2012 | Venkatakrishnan et al. | |
| 2012/0065789 A1 | 3/2012 | Scelzi et al. | |
| 2012/0079092 A1 | 3/2012 | Woxblom et al. | |
| 2012/0101651 A1 | 4/2012 | Haynes | |
| 2012/0173456 A1 | 7/2012 | Hirl | |
| 2012/0203379 A1 | 8/2012 | Sloo et al. | |
| 2012/0246279 A1 | 9/2012 | Zang et al. | |
| 2012/0316687 A1 | 12/2012 | Chen et al. | |
| 2012/0323637 A1 | 12/2012 | Cushing et al. | |
| 2013/0013121 A1 | 1/2013 | Henze et al. | |
| 2013/0103207 A1 | 4/2013 | Ruff et al. | |
| 2013/0116835 A1 | 5/2013 | Nowel | |
| 2013/0151012 A1 | 6/2013 | Shetty et al. | |
| 2013/0170481 A1 | 7/2013 | Crawford et al. | |
| 2013/0178986 A1 | 7/2013 | Lombard et al. | |
| 2013/0314210 A1 | 11/2013 | Schoner et al. | |
| 2014/0039690 A1 | 2/2014 | Steinberg | |
| 2014/0101082 A1 | 4/2014 | Matsuoka et al. | |
| 2014/0222241 A1 | 8/2014 | Ols | |
| 2014/0277761 A1 | 9/2014 | Matsuoka et al. | |
| 2014/0278264 A1* | 9/2014 | Bukhin | G06Q 50/06 703/1 |
| 2014/0297001 A1 | 10/2014 | Silverman et al. | |
| 2014/0309869 A1 | 10/2014 | Ricci | |
| 2014/0309892 A1 | 10/2014 | Ricci | |
| 2014/0371921 A1 | 12/2014 | Weaver et al. | |
| 2014/0379156 A1* | 12/2014 | Kamel | G01R 21/133 700/291 |
| 2015/0032264 A1 | 1/2015 | Emmons et al. | |
| 2015/0057824 A1* | 2/2015 | Gheerardyn | G06Q 10/06 700/296 |
| 2015/0100167 A1 | 4/2015 | Sloo et al. | |
| 2015/0168002 A1 | 6/2015 | Plitkins et al. | |
| 2015/0178421 A1 | 6/2015 | Borrell et al. | |
| 2015/0198346 A1 | 7/2015 | Vedpathak | |
| 2015/0248118 A1 | 9/2015 | Li et al. | |
| 2015/0277409 A1 | 10/2015 | Yamada | |
| 2015/0369847 A1 | 12/2015 | Roosli | |
| 2016/0088438 A1 | 3/2016 | Okeeffe | |
| 2016/0131388 A1 | 5/2016 | Eiynk et al. | |
| 2016/0201934 A1 | 7/2016 | Hester et al. | |
| 2016/0313751 A1 | 10/2016 | Risbeck et al. | |
| 2017/0055126 A1 | 2/2017 | O'Keeffe | |
| 2017/0123440 A1 | 5/2017 | Mangsuli et al. | |
| 2017/0191695 A1 | 7/2017 | Bruhn et al. | |
| 2017/0288401 A1 | 10/2017 | Hummon et al. | |
| 2018/0136621 A1 | 5/2018 | Buda et al. | |
| 2019/0242608 A1 | 8/2019 | Laftchiev et al. | |
| 2019/0338974 A1 | 11/2019 | Turney et al. | |

OTHER PUBLICATIONS

An, Lianjun et al. "An inverse PDE-ODE model for studying building energy demand." Proceedings of the 2013 Winter Simulation Conference, Dec. 8, 2013, pp. 1869-1880.

De Angelis et al. Optimal Home Energy Management Under Dynamic Electrical and Thermal Constraints, IEEE Transactions on Industrial Informatics; vol. 9, Iss. 3; 1518-1527, 2012, 12 pages.

European Patent Office, Extended European Search Report, EP Patent Application 17776874.4, dated Nov. 13, 2019, 13 pages.

International Search Report and Written Opinion dated Jun. 21, 2017, for International Patent Application No. PCT/US2017/025606, dated Jun. 21, 2017, 53 pages.

International Searching Authority, International Search Report and Written Opinion, PCT Patent Application PCT/US2020/043149, dated Sep. 28, 2020, 11 pages.

Vakiloroaya et al. A review of different strategies for HVAC energy saving. Energy, Conversion and Management; vol. 77; 735-754, 2014, 19 pages.

Bullis, Kevin, "Dumb Meters Get Smarter," <http://www.technologyreview.com/energy/22366>, Mar. 31, 2009, 2 pages.

Dave's Tech Blog, "Itron Remote Read Electric Meter," <http://davestech.blogspot.com/2008/02/itron-remote-read-electric-meter.html>, internet accessed on Nov. 8, 2010, 22 pages.

Doebber, I."Investigation of Concrete Wall Systems for Reducing Heating and Cooling Requirements in Single Family Residences" [online], Sep. 2004 [retrieved on Mar. 9, 2014], Retrieved from the Internet:<URL: http://scholar.lib.vt.edu/theses/available/>.

ECONorthwest, "Process Evaluation of the SCE Aug. 2006 Home Energy Efficiency Survey (HEES) Program," Aug. 2009. <URL: http://www.calmac.org/publications/SCE_HEES_Final_Report_080409_calmac_edit.pdf> entire document, 121 pages.

Extended European Search Report; European Patent Application No. 13824847.1; dated Jun. 7, 2016; 7 pages.

Hancock, Gregory, "Power monitoring to the people!" <http://www.gridinsight.com/2009/02/power-monitoring-to-the-people.html>, Feb. 25, 2009, 4 pages.

http://blog.microsoft-hohm.com/Hohm-energy-report-sample.aspx, accessed on Aug. 9, 2010.

http://efficiency20.com/, accessed on Aug. 9, 2010.

"http://hes.lbl.gov/consumer, accessed on Aug. 9, 2010".

"http://onzo.com/solutions/, accessed on Aug. 9, 2010".

"http://silverspringnetworks.com/products/index.html, accessed on Aug. 9, 2010".

"http://www.agilewaves.com/, accessed on Aug. 9, 2010".

"http://www.alertme.com/, accessed on Aug. 9, 2010".

"http://www.ambientdevices.com/products/energyjoule.html, accessed on Aug. 9, 2010".

"http://www.bluelineinnovations.com, accessed on Aug. 9, 2010".

"http://www.consert.com/, accessed on Aug. 9, 2010".

"http://www.diykyoto.com/, accessed on Aug. 9, 2010".

"http://www.energy-aware.com/, accessed on Aug. 9, 2010".

"http://www.energyhub.net, accessed on Aug. 9, 2010".

"http://www.google.com/powermeter/about/, accessed on Aug. 9, 2010".

"http://www.greenenergyoptions.co.uk/, accessed on Aug. 9, 2010".

"http://www.lem.com/hq/en/content/view/276/215/, accessed on Aug. 9, 2010".

"http://www.opower.com/Products/Overview.aspx, accessed on Aug. 9, 2010".

"http://www.powermand.com/dreamwatts-product, accessed on Aug. 9, 2010".

"http://www.tendrilinc.com/products/vision/,accessed on Aug. 9, 2010".

"http://www.theenergydetective.com/home, accessed on Aug. 9, 2010".

"http://www.theowl.com/, accessed on Aug. 9, 2010".

(56) References Cited

OTHER PUBLICATIONS

International Preliminary Report on Patentability and Written Opinion; International Patent Application No. PCT/US2013/053317; Applicant Tendril Networks, Inc.; dated Feb. 12, 2015; 8 pages.
International Search Report and Written Opinion; International Application No. PCT/US2011/061470; dated Apr. 9, 2014; 9 pages.
James Broberg, Rajkumar Buyya, Zhair Tari; MetaCDN: Harnessing 'Storage Clouds' for high performance content delivery; online publication date; Apr. 5, 2009: http://www.sciencedirect.com/science/article/pii/S1084804509000514.
Kennedy, James and Russell Eberhart. "Particle Swarm Optimization," Proceedings of the IEEE International Conference on Neural Networks (Perth, Australia), 1995, pp. 1942-1948.
Retzlaff et al. "Conservation & Energy Potential Study for Smith River Rancheria, Smith River Rancheria, Evergreen NRG/Strategic Energy Solutions, Aug. 2005, 417 pages."
U.S. Appl. No. 61/446,233; Inventor: Henze; filed Feb. 24, 2011, 17 pages.
WIPO International Search Report and Written Opinion, PCT/US2014/029543, dated Sep. 19, 2014, 12 pages.

\* cited by examiner

ORCHESTRATED ENERGY

RELATED APPLICATIONS

This application is a continuation of U.S. application Ser. No. 15/476,857, entitled ORCHESTRATED ENERGY, filed on Mar. 31, 2017, which claims the benefit of U.S. Provisional Application No. 62/317,426, entitled ORCHESTRATED ENERGY, filed on Apr. 1, 2016, both of which are herein incorporated by reference in their entirety. In cases where the present application and a document incorporated herein by reference conflict, the present application controls.

BACKGROUND

As energy resources become scarcer, and as people become more environmentally conscious, their desire optimize energy consumption and reduces costs has increased. Although there have been many attempts to improve energy conservation and reduce energy costs, these attempts do not typically satisfy the demands or goals of customers and/or utilizes or coordinate between the goals of those customers and utilities. For example, demand management systems (direct load control systems) enable utilities to essentially turn off end-user devices (e.g., air conditioning units) when demand peaks to, for example, avoid blackouts or rolling brownouts. However, end-users may not receive advance notice of the shutoff and may find themselves uncomfortable at inopportune times. As another example, a user can use a thermostat to create a temperature schedule for a building so that the user remains comfortable while occupying the building. However, the schedules may not take into account the cost of energy, thereby ignoring any potential for cost savings to the user, the utility, or both in a market that can have volatile pricing. Furthermore, while the "Internet of Things" has created a wealth of sensors and other devices within various energy systems to measure both the energy consumption of the system and the environment within which the system operates, these sensors do not often communicate effectively.

DETAILED DESCRIPTION

Figure 1:
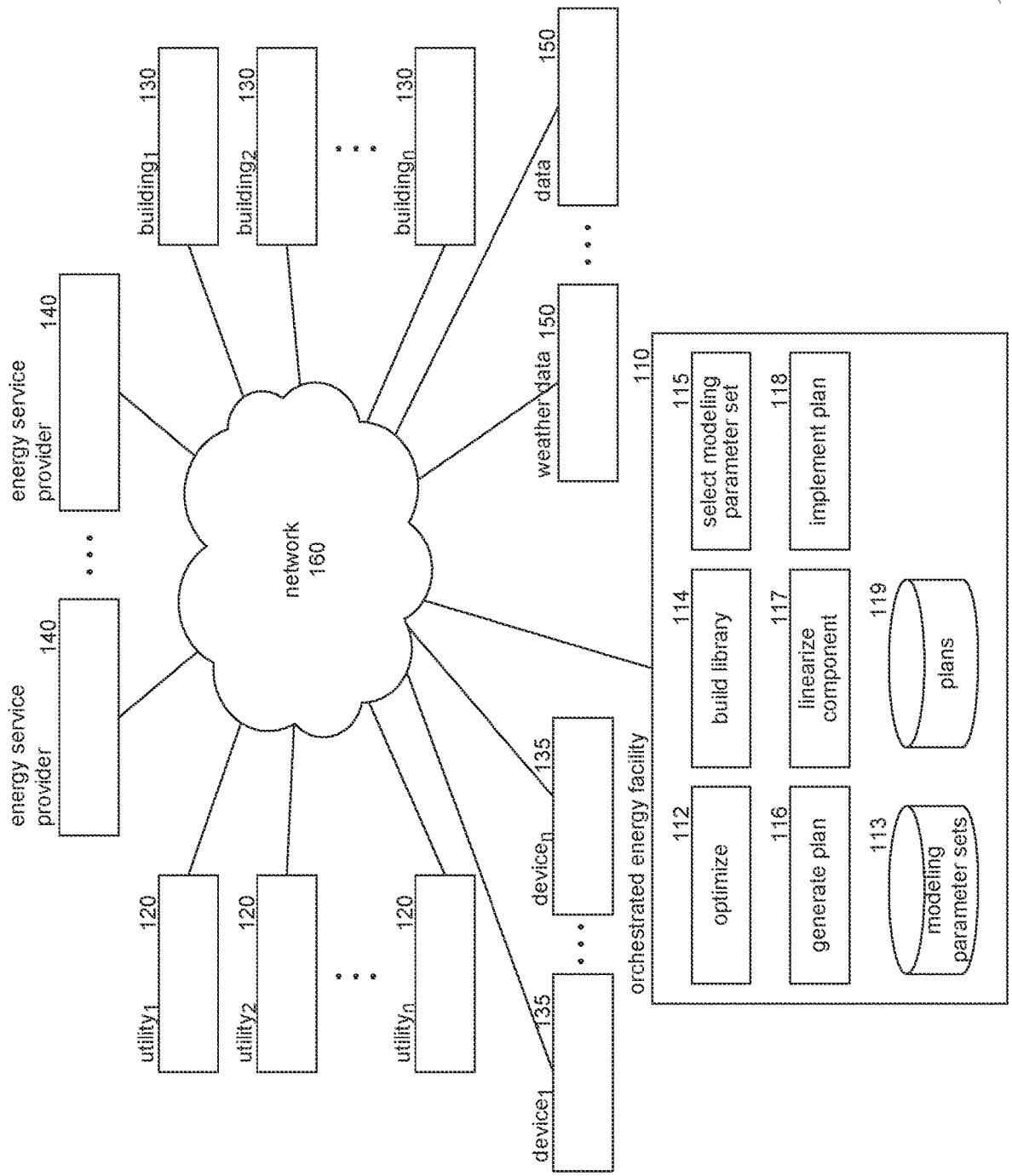
FIG. 1 is a block diagram illustrating an environment in which the disclosed facility may operate.

A facility providing systems and methods for managing and optimizing energy consumption and/or production is provided. The facility provides techniques for optimizing energy-consuming and energy-producing systems ("energy systems") to meet specified demands or goals, such as reducing load, reducing cost, increasing usage of specific types of energy sources (e.g., solar or wind), reducing usage of specific types of energy sources (e.g., coal or hydroelectric), increasing comfort within a building, and so on in accordance with various time-dependent constraints (e.g., a user's temperature comfort band during certain times of day, willingness to use energy provided by various sources (e.g., nuclear) during certain times of year). The demands, goals, and/or constraints may be specified by a resident or owner of one or more energy systems, a building, a utility, an energy service provider, and so on. For example, the facility may reduce the cost of energy (a goal) by shifting loads to lower-priced periods and avoiding loads during higher-priced periods. As another example, the facility may reduce the climate impact of loads (a goal) by shifting loads to lower carbon intense periods and avoiding loads during higher carbon intense periods. As another example, the facility may increase the use of "green" or renewable energy sources (a goal), such as sun, wind, rain, tide, waves, or geothermal energy, by reducing loads when provided energy comes from nonrenewable resources. As another example, the facility may increase the use of solar generation used onsite by shifting loads to periods of time with higher solar generation. One of ordinary skill in the art will recognize that the techniques disclosed herein provide improved techniques for controlling and using energy systems, such as a heating, ventilation, and air conditioning system, a solar panel system, a battery charging system, and so on. The disclosed techniques provide solutions to problems presented by previous techniques of controlling and using energy systems, such as inefficient use of these systems (both in terms of financial cost and energy usage), improper use of these systems (e.g., overuse), inconvenient control by demand management systems, improper scheduling, and so on.

The facility can also take into account various constraints while generating an optimization for a system. For example, a user may wish to constrain the indoor temperature of a building to between an upper and lower bound of the user's comfortable temperature range; constrain the outlet water temperature between the upper and lower bound of the user's hot water temperature range; constrain a battery's charge level to meet the user's objective, for example, maintaining a minimum charge level for emergency discharge of the battery; constrain an electric vehicle's charge level to meet the user's electric vehicle charge goal that will yield a certain number of vehicle miles traveled by a certain time; constrain the lumen level of a lighting system to meet the user's upper and lower bound of lighting levels; and/or constrain the particulate level of a pool between the upper and lower bound of the user's particulate concentration range. The facility can be configured to optimize energy consumption or production in accordance with optimization goals and constraints for any type of energy system, such as an individual device (e.g., a lamp, a pool pump, a water heater); a system comprising multiple controllable devices, such as a house or a bank of solar panels; a larger system comprising multiple buildings (e.g., a block of houses or an entire neighborhood), and so on. Accordingly, the facility provides optimization techniques for energy systems in accordance with specified goals and constraints.

In some embodiments, the facility relies on a number of non-linear generic models (e.g., a generic thermal model, a generic electrical model) to generate an optimization for an energy system. Each non-linear generic model relates a number of inputs and attributes of an energy system to a number of outputs or responses of the energy system. In other words, each non-linear generic model comprises one or more equations that can be used to calculate or estimate a specific value (e.g., indoor temperature, charge, water temperature, lumens) based on a set of inputs (e.g., outdoor temperature, outdoor wind pressure, state of charge transfer, light state). For example, a non-linear generic model may relate a number of dependent or predictive variables to one or more independent variables (explanatory variables and/or calibration variables) of an energy consumption system along with any external factors affecting the energy system (i.e., its surrounding environment). In this manner, calculations or estimates for predictive variables depend on the one or more observables (e.g., explanatory variables, the calibration variables, and/or external factors). For example, a non-linear generic model for the energy consumption of a heating, ventilation, and air conditioning (HVAC) system within a building may relate a predictive variable for a thermostat (e.g., indoor temperature) to states of various HVAC equipment (e.g., thermostat settings, air condition settings, fan settings), outdoor temperature and extent of cloud cover, and/or any of the calibration variables in Table 1.

For example, one open source thermal model for a building is Energy Plus described by Crawley, D. B., Lawrie, L. K., Winkelmann, F. C., Buhl, W. F., Huang, Y. J., Pedersen, C. O., Strand, R. K., Liesen, R. J., Fisher, D. E., Witte, M. J. and Glazer, J., 2001 in EnergyPlus: creating a new-generation budding energy simulation program. *Energy and Buildings,* 33(4), pp. 319-331, which is herein incorporated by reference in its entirety. One of ordinary skill in the art will recognize that a model may include any number of inputs to the model and relate those inputs to any number of outputs or responses for the model. Furthermore, one of ordinary skill in the art will recognize that various models may be generated for different devices, device types, and/or systems associated with energy consumption, such as thermostat settings, solar consumption, water heater usage, battery usage and charging, electric vehicle chargers, lighting, systems, pool pumps, and so on. Predictive variables or outputs for a model may include, for example, indoor humidity, solar power production, outlet water temperature, battery charge, electric vehicle charge, lighting lumens, particulate level in a pool, filter pressure in a pool, and so on. Explanatory variables or inputs to a model may include, for

TABLE 1

| Variable Name (examples) | SI Units (Standard International notation) | Description |
| --- | --- | --- |
| coolingSystemCapacity | W | thermal capacity of the building cooling system |
| heatingSystemCapacity | W | thermal capacity of the building heating system |
| cooling_COP | unitless | coefficient of performance of the cooling system |
| heating_COP | unitless | coefficient of performance of the heating system |
| R_wall | (K * m^2)/W | thermal resistance of the building exterior walls |
| rho_wall | kg/m^3 | mass-density of the building exterior walls |
| cp_wall | Wh/(kg * K) | specific heat capacity of the building exterior walls |
| thick_wall | m | thickness of the building exterior walls |
| SHGC_wall | unitless | solar heat gain coefficient of the building exterior walls (from direct beam irradiance) |
| H_wall | W/(K * m^2) | heat transfer or film coefficient of the building exterior walls |
| winWallRatio | unitless | ratio of window area to the building exterior wall area |
| H_window | W/(K * m^2) | heat transfer or film coefficient of the building windows |
| R_window | (K * m^2)/W | thermal resistance of the building windows |
| U_window | W/(K * m^2) | thermal conductivity of the building windows |
| SHGC_window | unitless | solar heat gain coefficient of the building windows (from direct beam irradiance) |
| SHGCd_window | unitless | solar heat gain coefficient of the building windows (from diffuse irradiance) |
| nWinPanes | unitless | number of panes of glass in the building windows |
| H_mass | W/(K * m^2) | heat transfer or film coefficient of the building internal mass |
| rho_mass | kg/m^3 | mass-density of the building internal mass |
| cp_mass | Wh/(kg * K) | specific heat capacity of the building internal mass |
| thick_mass | m | thickness of the building internal mass |
| H_floor | W/(K * m^2) | heat transfer or film coefficient of the building floor |
| R_floor | (K * m^2)/W | thermal resistance of the building floor |
| U_floor | W/(K * m^2) | thermal conductivity of the building floor |
| rho_floor | kg/m^3 | mass-density of the building floor |
| cp_floor | Wh/(kg * K) | specific heat capacity of the building floor |
| thick_floor | m | thickness of the building floor |
| R_roof | (K * m^2)/W | thermal resistance of the building roof |
| rho_roof | kg/m^3 | mass-density of the building roof |
| cp_roof | Wh/(kg * K) | specific heat capacity of the building roof |
| thick_roof | m | thickness of the building roof |
| SHGC_roof | unitless | solar heat gain coefficient of the building roof |
| pGain_hourly | W | internal thermal gains due to people |
| lGain_hourly | W | internal thermal gains due to lights |
| eGain_hourly | W | internal thermal gains due to appliances |
| ACH | 1/hr | infiltration factor or number of air changes per hour |
| H_kappa | W/K | coefficient of convective heat transfer between bulk and laminar air components, scaled by the area of thermal interface between the two air zones | example, panel orientation and inverter efficiency module for a solar panel system; inlet water temperature and state of heating element for a water heater; state of charge transfer and battery temperature for a battery; state of charge transfer, battery temperature, and distance traveled for an electric vehicle charging system; light state for a lighting system; pump state, pump flow rate, and water temperature for a pool pump; and so on. For further discussion and use of models, please see U.S. patent application Ser. No. 13/829,252, filed Mar. 14, 2013, entitled Personalization of Recommendations Based on Building Model and Behavioral Science, which is herein incorporated by reference in its entirety.

In some embodiments, an energy system may react differently to the same inputs depending on, for example, the current state of the system, external factors affecting the system, and so on. For example, the current indoor temperature of a building may change at different rates when a thermostat is set to 70° F. if the current indoor temperature is 65° F. than if the current indoor temperature is 45° F. Similarly, the rate at which a battery can be charged may differ depending on the current charge and age of the battery. Thus, in order to use the generic models to simulate and optimize energy consumption for an energy system, the generic models can be calibrated to properly represent or approximate conditions of the energy system during the optimization period (i.e., the period during which the facility is to optimize energy consumption and/or production). For example, the facility can be configured to optimize energy consumption on a daily basis, where each consecutive twenty-four-hour period represents a separate optimization period.

In some embodiments, the facility uses modeling parameter sets to calibrate a generic model for a specific situation. A modeling parameter set relates a number of actual environmental conditions to actual physical characteristics of the energy system. For example, a modeling parameter set for a building may relate specific values for a thermal envelope, a strength of response, heat gain, thermal mass, starting temperatures of surfaces within the building, and so on to specific values for weather conditions, occupancy information for the building, and so on. As another example, a modeling parameter set for a solar system may relate energy production to solar path information and cloud cover. In other words, each modeling parameter set specifies how physical characteristics (e.g., calibration variables) of the energy system are affected or influenced by environmental conditions. Thus, each modeling parameter set enables the facility to calibrate a model so that the model properly represents or approximates physical characteristics of the energy system given a set of environmental conditions so that the facility can predict the behavior of the energy system during future periods having similar predicted environmental conditions. Thus, if the facility is to simulate conditions within an energy system during a particular day or other period, the facility can determine predicted environmental conditions for that day or period and retrieve a corresponding modeling parameter set from a modeling parameter set library in order to calibrate the model. As an example, a calibrated model may take the form of the set of coefficients representing the thermal conductance and resistance in the Energy Plus simulation.

In some embodiments, each calibrated model is a physics-based model of an energy system comprising a set of functions or a set of data capable of being used by generic functions to predict operating conditions of that energy system. For example, a calibrated model (or associated data) for a building may include 1) entries for the building's location, square footage, type of heating, and amount of insulation, and 2) a set of functions that produce, for a budding with this kind of heating and insulation, given a particular day of the year, the likely energy consumption due to heating on the given day. In some cases, the model may include additional details about the building, such as demographics of the occupants, historical behavior measured through interactions with the system, historical consumption, committed and completed savings actions, and responses to questionnaires. With this information, the system can find correlations, for example a probabilistic model, between inputs to the energy system and the energy system's predicted responses to those inputs.

In some embodiments, a modeling parameter set library is generated by taking actual measures of the corresponding physical characteristics of the energy system under actual environmental conditions over the course of a modeling period (e.g., over the course of an hour, a day, a week, a month). For example, the facility may generate a modeling parameter set for a building that relates envelope and thermal response of the building to external temperature over the course of a day by periodically determining envelope, thermal response, and external temperature values during the day. As another example, the facility may repeatedly measure or obtain values for each of a plurality of variables (e.g., the variables in Table 1) along with measurements for other environmental conditions, such as time of day, energy fee schedules, outdoor temperature, outdoor humidity, outdoor wind speed, outdoor air pressure, outdoor irradiance (global, direct, horizontal), equipment states (e.g., on, off, thermostat settings, fan speeds, air conditioning unit settings), and so on. The facility can communicate with various sensors and/or meters located in or around the building to ascertain these values. Alternatively, or additionally, the facility may retrieve these values from one or more external sources, such as an online weather service or directly from users. In some cases, the facility may not be able to obtain measures for certain variables directly (i.e., "non-measureable attributes" or "non-measurable variables"). For example, there may be no way of measuring a thermal capacity of a budding heating system, a coefficient of performance of the cooling system, a heat transfer or film coefficient of the building's windows, and/or a thermal resistance of the building windows. In these cases, the facility can iterate over the non-measureable attributes in order to estimate a value for these non-measureable attributes by determining which values, when plugged into the corresponding model, provide the best fit for the conditions measured over the modeling period. In some embodiments, the facility relies on an error tolerance value to determine how many simulations to perform. When the difference between the measured data and the modelled data is within the "error tolerance," then the facility stops performing the simulations. In some cases, the facility sets an error tolerance automatically based on, for example, the measured data. In some cases, an error tolerance value can be set by a user. One of ordinary skill in the art will recognize that a modeling parameter set may relate any number of physical characteristics of an energy system to any number of environmental conditions. In some cases, one environmental condition may act as a proxy for another. For example, a day of the week can act as a proxy for occupancy within a building where the building experiences similar levels of occupancy during each particular day of the week (e.g., "Sunday," "Monday," and so on), such as a business that is open during each weekday but closed on the weekend. By regularly generating modeling parameter sets for a particular energy system, the facility can establish a library for any number of environmental conditions and the corresponding physical attributes of the energy system. In some embodiments, the facility may use a modeling parameter set generated for one energy system to calibrate a model for another energy system. For example, modeling parameter sets generated for one home may be applicable to a neighboring home having a similar floor plan and having been constructed from similar construction materials. Furthermore, the facility may generate blended modeling parameter sets by interpolating values from a combination of modeling parameter sets.

In some embodiments, after the appropriate models have been calibrated for a given situation using one or more modeling parameter sets, the facility can linearize constraints for the energy system and generate a plan for the energy system based on the objectives and linearized constraints. For example, if a model for a lighting system has been calibrated using a modeling parameter set selected for the following twenty-four-hour period, the facility can uses the calibrated model to simulate different inputs to the lighting system and predict various outputs or responses from the lighting system over the twenty-four-hour period. Similarly, a building thermal model calibrated based on a predicted weather forecast and day of the week can be used to simulate changes (inputs) to a thermostat over the course of the next twenty-four hours and predict how those changes to the thermostat would impact the temperature (outputs) within the building. The simulations can be generated at any level of granularity (e.g., simulating input changes every one minute, five minutes, hour, day, and so on). In some embodiments, the facility invokes an optimization simulator, such as a particle swarm optimization simulator, to simulate any number of inputs (including a string of inputs) to the energy system and generate a range of outcomes for the inputs and the probability that these outcomes will occur. For example, a simulation of the thermal conditions within a building may simulate a number of changes to the thermostat over the course of a day to generate a prediction of the temperature within the building based on those changes based on simulated external conditions. Similarly, a simulation of a solar power generation system may simulate a number of changes to solar panel power output based on a simulated path of the sun (external conditions) to produce a prediction of power production of the system. One of ordinary skill in the art will recognize that other optimization techniques may be used to simulate inputs to and the corresponding responses of an energy system, such as a Monte Carlo simulation algorithm, simulated annealing[1], a particle swarm algorithm[2], an ant colony simulation algorithm, and so on.

[1] Mitchell, Melanie, *An Introduction to Genetic Algorithms*, Cambridge, Mass.: MIT (1996).
[2] Kennedy, J.; Eberhart, R., "Particle Swarm Optimization," *Proceedings of IEEE International Conference on Neural Networks*. pp. 1942-1948 (1995). doi:10.1109/ICNN.1995.488968.

In some embodiments, the facility uses simulated inputs to generate a plan, or control schedule, to be implemented by the energy system during the optimization period. To generate the plan, the facility invokes a linear program to identify a set of inputs to the system that best suit the desired goals or objectives based on the linearized constraints. For example, if the optimization goal is to reduce power consumption, then the facility can identify the simulation resulting in the lowest power consumption while satisfying any related constraints (or with the smallest degree of constraint violation). In some cases, the facility invokes a linear optimization program, such as an integer linear program or a mixed integer linear program, to identify the optimal set of inputs. In some cases, the facility may further analyze the output of the simulation to generate additional values related to the optimization goals and/or constraints. For example, if the optimization goal is to reduce cost to the consumer, the facility can calculate the cost of each simulation based on, for example, a fee schedule provided by a utility and the energy usage rate of the energy system for each simulated input. In some embodiments, the facility can determine the extent to which a simulation violates a constraint by determining the duration and magnitude of each violation. In other words, the facility can determine the extent to which a simulation violates one or more constraints by measuring the area between the simulated response curve and constraint curve(s) while the response curve is in violation of the constraint curves(s). In this manner, if all of the simulations violate at least one constraint, the facility can at least identify a simulation with minimal constraint violations. In some cases, the facility may recommend one of these constraint-violating simulations to a user and alert the user of the extent of the violation and any corresponding improvement on an optimization goal so that the user can determine whether the violations are significant enough to forgo a control schedule that improves on an optimization goal. Similarly, even when there are simulations that satisfy all of the constraints, the facility can alert a user to a constraint-violating simulation that further improves on the desired optimization goal relative to the constraint-satisfying simulations. For example, the facility may alert a user that a relatively small change to a constraint (e.g., lowering the lower bound of a comfort temperature range by one degree) can have a disproportionately large and favorable change with respect to an optimization goal (e.g., 20% reduction in energy costs). In some cases, the facility may select a constraint-violating simulation if the constraint-violating simulation better satisfies an optimization goal and the extent of the violations does not exceed a predetermined threshold. A user may be able to explicitly opt out of these selections during a setup or configuration process or implicitly opt out by overriding inputs to the energy system while the corresponding plan is being executed by the energy system.

In some embodiments, once a simulation is selected, the facility converts the simulated inputs to control instructions and transmits the control instructions for execution by the corresponding energy system and related devices. For example, simulated inputs for a thermostat can be converted to instructions for controlling the thermostat and then transmitted to the thermostat or a related control device. Alternatively, the control instructions may be transmitted to a home automation cloud service for transmission to a corresponding device in accordance with policies of the home automation service. The control instructions may be transmitted individually or as part of a comprehensive schedule. Accordingly, the control schedule can be implemented or executed by the appropriate devices and systems during the corresponding optimization period to best meet the optimization goals used to generate the simulations in accordance with any corresponding constraints. In some instances, the facility may periodically or regularly compare actual environmental conditions to the predicted environmental conditions used to select a modeling parameter set for model calibration. In response to determining that actual environmental conditions are significantly different from environmental conditions associated with the modeling parameter set, the facility can update the environmental conditions and generate a new plan for the energy system. For example, if the selected modeling parameter set for a building specifies no occupancy from 9 a.m. to 5 p.m. but the facility determines that the building has been occupied from 9 a.m. to 11 a.m. (and assumes that the building will remain occupied), the facility can select a new modeling parameter set to reflect this variation. As another example, the facility may generate a new control schedule when the actual outdoor temperature is significantly different from predicted temperature values used to select a modeling parameter set (e.g., if a predicted maximum or minimum temperature is off by more than 20%). Similarly, if the facility determines that a user or other entity regularly overrides the adjustments caused by the control schedule, the facility may automatically update one or more constraints and select a new simulation for implementation. For example, if the control schedule was generated based on a constraint that specifies that the internal temperature should not drop below 65° F. but the thermostat is adjusted up (higher temperature) every time the internal temperature drops below 70° F., the facility can use a new constraint specifying that the internal temperature should not drop below 70° F. in order to select a more appropriate simulation and generate a new control schedule.

FIG. 1 is a block diagram illustrating an environment 100 in which the disclosed facility may operate in accordance with some embodiments of the disclosed technology. Environment 100 includes orchestrated energy facility 110, utilities 120, buildings 130, devices 135, energy service providers 140, data services 150, and network 160. Orchestrated energy facility 110 comprises optimize component 112, modeling parameter sets data store 113, build library component 114, select modeling parameter set component 115, generate plan component 116, linearize component 117, implement plan component 118, and plans data store 119. The facility invokes optimize component 112 to generate and implement a plan for an energy system that best satisfies a specified goal in a manner consistent with specified constraints. Modeling parameter sets data store 113 stores modeling parameter sets for any number of devices or systems, such as an entire building or any individual devices, such as a water pump, a pool heater, a lamp, and so on. The facility invokes build library component 114 to generate and store modeling parameter sets for an energy system over a predefined period. The facility invokes select modeling parameter set component 115 to select an appropriate modeling parameter set for an optimization period. The facility invokes generate plan component 116 to generate a plan for an energy system based on a set of goals and/or constraints.

The facility invokes linearize component 117 to linearize a segment of an energy system response system. The facility invokes implement plan component 118 to implement the simulated inputs in an energy system for which the plan was generated. Plans data store 119 stores the plans generated by generate plan component 116 or plans received from other sources, such as a utility or a user, such as a custom plan generated by or on behalf of a user. Each user may be affiliated with a particular building (e.g., the owner of a home, the facilities manager of a building, and so on). In some cases, a user may interact with the facility via a fixed device (e.g., a smart thermostat connected to an HVAC system, a handheld mobile device or other computing device configured to communicate with the facility). For example, the facility may send messages to the user, such as alerts to communicate changes to a control schedule, alternative control schedules that may be more efficient, costs savings for a particular optimization period, progress with respect to a particular goal for an energy system, and so on. These messages may include prompts asking the user various questions with respect to the optimizations, such as whether they are currently comfortable with how the energy system is operating (e.g., "Is the room warm enough?", "Is the room warm enough when you wake up?," "Is the pool clean enough?," "Is the electric vehicle battery sufficiently charged when you need it?").

In some embodiments, various components of the facility may be executed within a single computing device or may be distributed among a plurality of computing systems, including remote computing systems. For example, in some embodiments the orchestrated energy facility 110 may be stored at and under the control of a utility 120 or within a building 130. As another example, one or more generate plan components 116 may execute under control of a utility 120 while one or more implement plan components 118 execute within a building 130, device 135, and so on. Utilities 120 each represent one or more companies or entities that manage and provide access to various resources, such as electricity, natural gas, cable, water, and sewage, and so on to end users. For example, utilities 120 may include a gas company, an electric company, a public water utility, and so on, Each utility may provide the facility with, for example, cost information, such as an energy cost schedule. Buildings 130 and devices 135 represent various systems and devices for which the facility may optimize energy consumption or which the facility may use to optimize energy consumption. For example, one device may include a sensor for measuring ambient air temperature inside or outside a building, pool temperature, battery temperature, external humidity, and so on.

The buildings and devices can include any number of energy systems, devices, sensors, and so on, that may be used to provide environmental system characteristics to the facility. For example, a building may include a thermostat that can provide the facility with current settings for an HVAC system within the building. The facility may communicate with these devices directly or indirectly (e.g., via a home automation system cloud, such as the ECOBEE cloud). In some cases, the facility uses a device abstraction layer or service so that the facility can communicate with the different devices (e.g., devices from different companies) using a consistent set of messages over all devices. The device abstract layer or service provides a translation between the native communication protocol for the facility and the native communication protocol for a particular device. In this manner, the facility is agnostic with respect to which devices and systems the facility uses to collect information and/or implement optimized control schedules. Energy service providers 140 represent entities that sell energy to the utilities. Data providers 150 provide access to information that the facility may use to, for example, select modeling parameter sets or generate simulations, such as weather information (e.g., forecasts and actual values of temperature, humidity, pressure), energy cost information, sun information (e.g., sunrise, sunset, position, path). Network 160 represents communications links over which the various elements of environment 100 may communicate, such as the Internet, a local area network, and so on.

The computing devices and systems on which the orchestrated energy facility 110 and related components may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touchscreens, gesture recognition devices (e.g., for air gestures), thermostat, smart devices, head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the collaboration icon system. In addition, the stored information may be encrypted. The data transmission media are used for transmitting data via transitory propagating signals or carrier waves (e.g., electromagnetism) via a wired or wireless connection. In addition, the transmitted information may be encrypted. In some cases, the facility may transmit various alerts to a user based on a transmission schedule, such as an alert to inform the user that a goal for a given period has or has not been met or that one or more changes to a constraint may enable the system to further optimize a goal. Furthermore, the facility may transmit an alert over a wireless communications channel to a wireless device associated with a remote user to a computer of the remote user based on a destination address associated with the user and a transmission schedule. In some cases, such an alert can activate a viewer application to cause the alert to display on a remote user computer and to enable connection via a URL to a data source over the Internet when the wireless device is locally connected to the remote user computer and the remote user computer comes online. Various communications links may be used, such as the Internet, a local area network, a wide area network, a point-to-point dial-up connection, a cell phone network, and so on.

The orchestrated energy facility 110 may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the orchestrated energy facility 110 may be implemented in hardware using, for example, an application-specific integrated circuit (ASIC).

Figure 2:
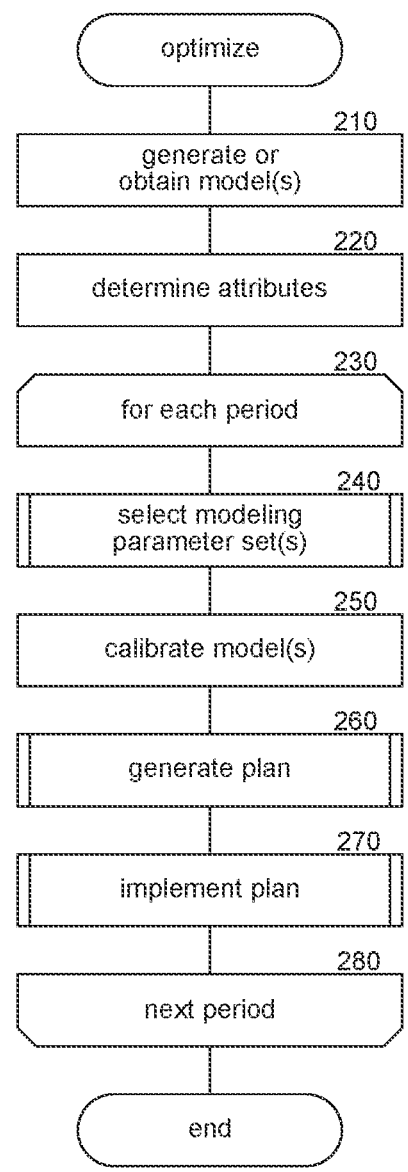
FIG. 2 is a flow diagram illustrating the processing of an optimize component.

FIG. 2 is a flow diagram illustrating the processing of an optimize component in accordance with some embodiments of the disclosed technology. The optimize component is invoked by the facility to generate and implement a plan for an energy system that best satisfies a specified optimization goal or goals in a manner consistent with specified constraints over an optimization period. In block 210, the component obtains or generates one or more generic models based on the physics of the energy consuming device. Each generic model includes one or more inputs and one or more outputs and relates the inputs to the outputs. For example, an energy model for a building may include inputs related to, for example, a) climate, b) (thermal) envelope, c) internal gains from lighting, equipment, and occupants, d) heating, cooling, and ventilation systems, e) schedules of occupants, f) equipment, g) lighting, h) utility rates, and so on, and output energy use predictions related to, for example, a) heating, b) cooling, c) lighting, d) fan, and so on. As another example, an energy model for a battery-charging system may include inputs related to battery type, battery age, battery temperature, and so on, and output predictions related to battery charge, rate of charge, and so on. In some embodiments, rather than (or in addition to) obtaining or generating a generic model, the component generates a predictive model from measured values (e.g., previously-measured values corresponding to predictive and independent variables for the model) using standard modelling or machine learning techniques, such as supervised learning techniques, regression techniques (e.g., linear regressions, logistic regressions, polynomial regressions, stepwise regressions, boosted tree regressions, gradient boosting), random forests, classification and regression trees, neural networks, least squares, and so on. In block 220, the component determines attributes of the energy system and the period for which energy consumption is to be optimized, such as the size of a building, weather forecast information, energy pricing and tariff information, light bulb types, and so on. In blocks 230-280, the component repeatedly (e.g., once per hour, once per day, twice per day, in response to a user interaction) generates and implements a plan for the energy system in accordance with optimization goals and constraints. In block 240, the component invokes a select modeling parameter set component, which selects or generates an appropriate modeling parameter set for the energy system and the optimization period based at least in part on the determined attributes. In block 250, the component calibrates any generic model(s) using the collected observables and selected modeling parameter set. In block 260, the component invokes a generate plan component to determine a set of inputs to the energy system that best satisfies the optimization goals in accordance with the constraints. In block 270, the component invokes an implement plan component to cause the energy system to implement the determined set of inputs during the optimization period. In block 280, the component loops back to block 240 to select a modeling parameter set for optimization during a subsequent period. In some cases, processing of the component may complete if there is no corresponding subsequent period. In some embodiments, a means for optimizing an energy system comprises one or more computers or processors configured to carry out an algorithm disclosed in FIG. 2 and this paragraph in the order described therein.

Figure 3:
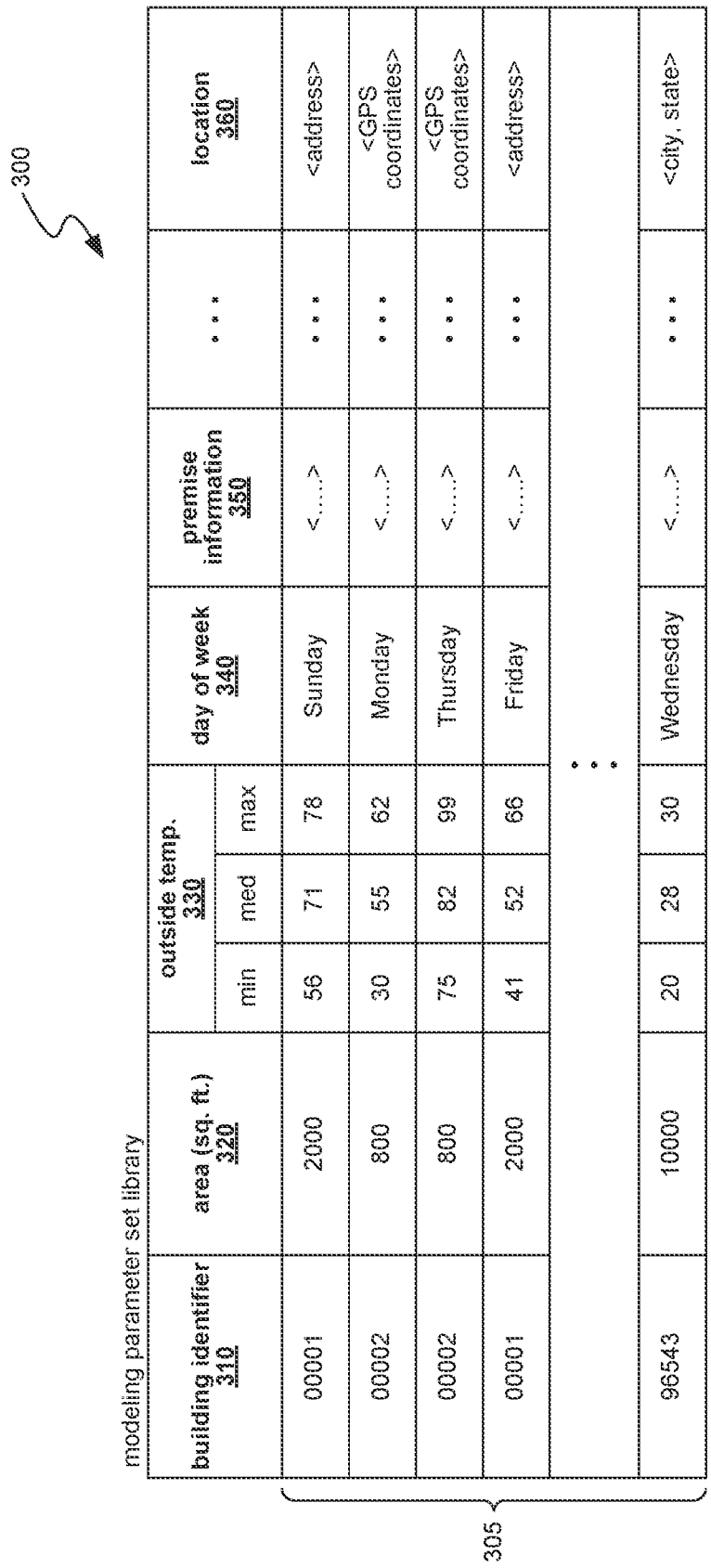
FIG. 3 is a data structure diagram illustrating a modeling parameter sets data store.

FIG. 3 is a data structure diagram illustrating a modeling parameter sets data store in accordance with some embodiments of the disclosed technology. Modeling parameter set library 300 includes a number of modeling parameter sets for various buildings. In this example, each of the modeling parameter sets was generated over the course of a day by collecting observable information for the building and measures various values over the course of the day. Modeling parameter set library 300 includes rows 301-305, each corresponding to a modeling parameter set, and columns 310-360. Column 310 represents a building identifier for each row. The building identifier is a unique identifier for the building for which the corresponding modeling parameter set was generated. Column 320 stores a size value (square footage) for the building. Outside temp column 330 stores three temperature values for the building based on measurements taken over the course of the day, including minimum (min) temperature, median (med) temperature, and maximum (max) temperature. Day of the week column 340 stores the day of the week for which the modeling parameter set was generated. Premise information 350 stores additional information (not shown) related to energy consumption within the building, such as construction material, device information (e.g., brand, model), insulation type, and so on, such as information stored in a binary large object. Location column 360 stores location information for each building, such as an address, GPS coordinates, city and state information, and so on. One skilled in the art will appreciate that while FIG. 3 provides an illustration that is easily comprehensible by a human reader, the actual information may be stored using different data structures and data organizations. Furthermore, one of ordinary skill in the art will recognize that the modeling parameter set library 300 may include additional columns storing values for other variables and attributes, such as date, time, time range, and so on. Furthermore, modeling parameter set library 300 may include parameter sets for energy system(s) and/or device(s) other than buildings or devices within buildings. Additionally, information for different variables or groups of variables may be stored in separate data structures.

Figure 4:
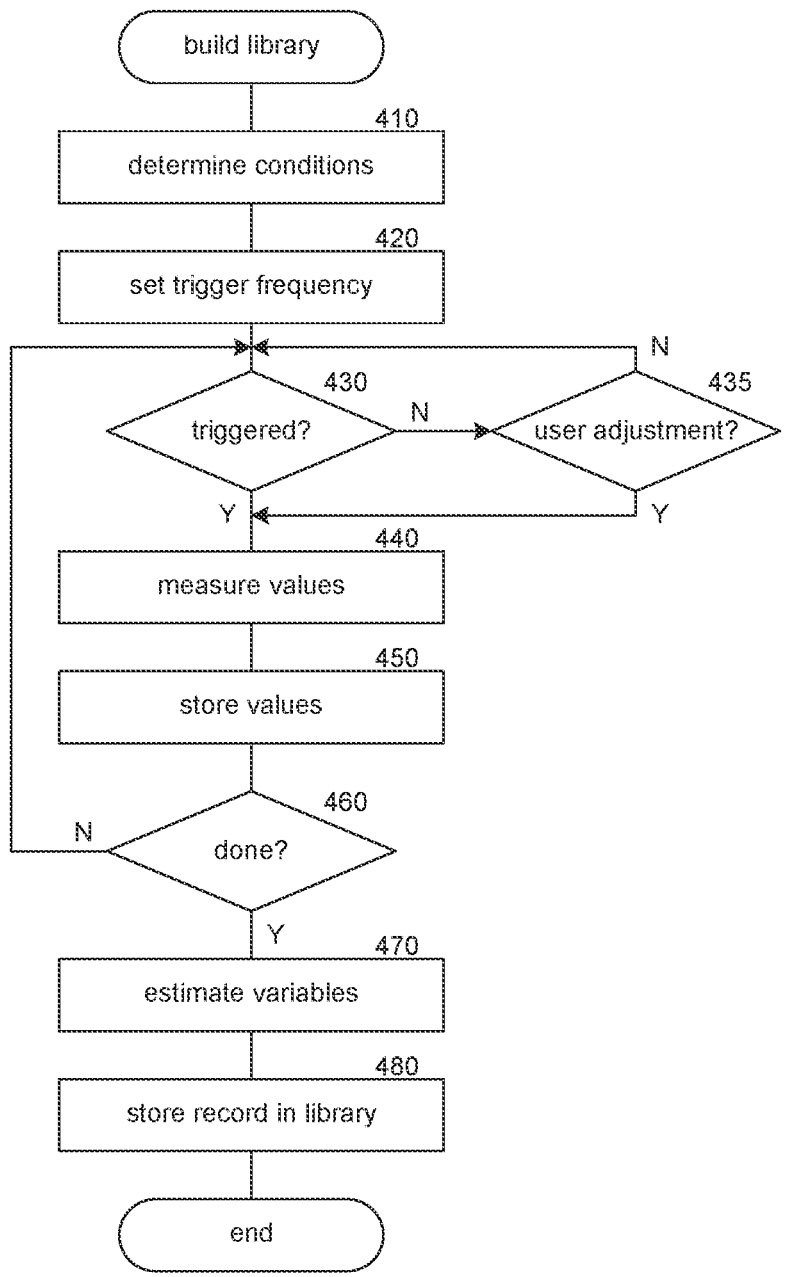
FIG. 4 is a flow diagram illustrating the processing of a build library component.

FIG. 4 is a flow diagram illustrating the processing of a build library component in accordance with some embodiments of the disclosed technology. The build library component is invoked by the facility to generate and store modeling parameter sets for an energy system over a pre-defined period. In block 410, the component collects the observable values for the modeling parameter set to be generated, such as square footage of a building, fixed premise information, the day of the week, location information for the building, and so on. In block 420, the component sets a measurement frequency, which determines how often the component measures the measureable values to be included in the modeling parameter set to be generated (e.g., once per minute, once per hour, once every other hour, and so on). In decision block 430, if a measurement is triggered (i.e., if the measurement frequency time has been satisfied), then the component continues at block 440, else the component continues at block 435. In decision block 435, if the component determines that a user has made an adjustment to one or more inputs to the energy system, then the component continues at block 440, else the component continues at decision block 430. In block 440, the component measures the measureable values to be included in the modeling parameter set to be generated, such as the current outdoor temperature, humidity, time, and so on. In block 450, the component stores the measured values. In decision block 460, if the predefined period has expired, then the component continues at block 470, else the component loops back to decision block 430. In block 470, the component iterates over the non-measureable values included in the modeling parameter set (e.g., calibration variables that may not be measurable directly) to estimate a value for each. In one embodiment, the component established the non-measurable values in the modeling parameter set using a particle swarm technique, a simulated annealing technique, or the like. In block 480, the component stores a new record in a modeling parameter set library. In some cases, the component may further analyze the measured variables before storing, such as determining a minimum, median, and/or maximum value for one or more variables measured over the course of the predefined period. In some embodiments, a means for building a modeling parameter set library comprises one or more computers or processors configured to carry out an algorithm disclosed in FIG. 4 and this paragraph in the order described therein.

Figure 5:
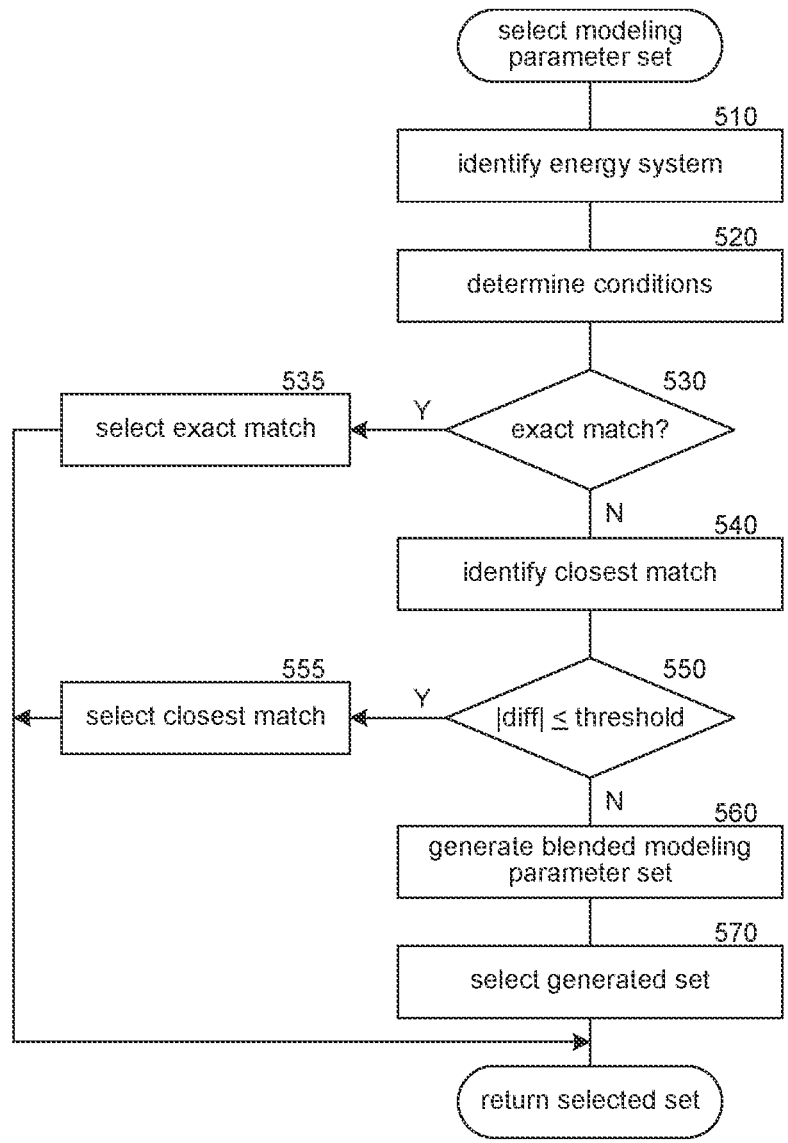
FIG. 5 is a flow diagram illustrating the processing of a select modeling parameter set component.

FIG. 5 is a flow diagram illustrating the processing of a select modeling parameter set component in accordance with some embodiments of the disclosed technology. The select modeling parameter set component is invoked by the facility to select an appropriate modeling parameter set for an optimization period. In block 510, the component identifies the energy system to be optimized using the modeling parameter set to be selected. For example, the component may receive an indication of a unique identifier of the energy system. In block 520, the component determines the conditions of the energy system and relevant environment for the optimization period, such as forecasted weather information, predicted occupancy information, day of the week, and so on. The component compares the determined condition information to modeling parameter sets in one or more modeling parameter set libraries to determine whether there is an exact match. In decision block 530, if there is an exact match, then the component continues at block 535, else the component continues at decision block 540. In block 535, the component selects the exact match and then returns the selected modeling parameter set. In block 540, the component identifies the closest match between the determined conditions and the stored modeling parameter sets. For example, the component may calculate a distance between the determined conditions and each of the stored modeling parameter sets. For example, if the forecasted minimum, median, and maximum outdoor temperatures for a building are 60, 70, and 80, respectively, then the distance between the temperature values for modeling parameter set 301 and the forecasted values can be calculated according to the following equation:

$$\sqrt{(56-60)^2+(71-70)^2+(78-80)^2}.$$

In some cases, the component may apply weights to various attributes used to calculate the distance. In decision block 550, if the difference between the closest match and the determined conditions is less than or equal to a predetermined threshold, then the component continues at block 555, else the component continues at block 560. In block 555, the component selects the closest match and then returns the selected modeling parameter set. In block 560, the component generates a blended modeling parameter set. In block 570, the component selects the blended modeling parameter set and then returns the selected modeling parameter set. In some embodiments, a means for selecting a modeling parameter set comprises one or more computers or processors configured to carry out an algorithm disclosed in FIG. 5 and this paragraph in the order described therein.

Figure 6:
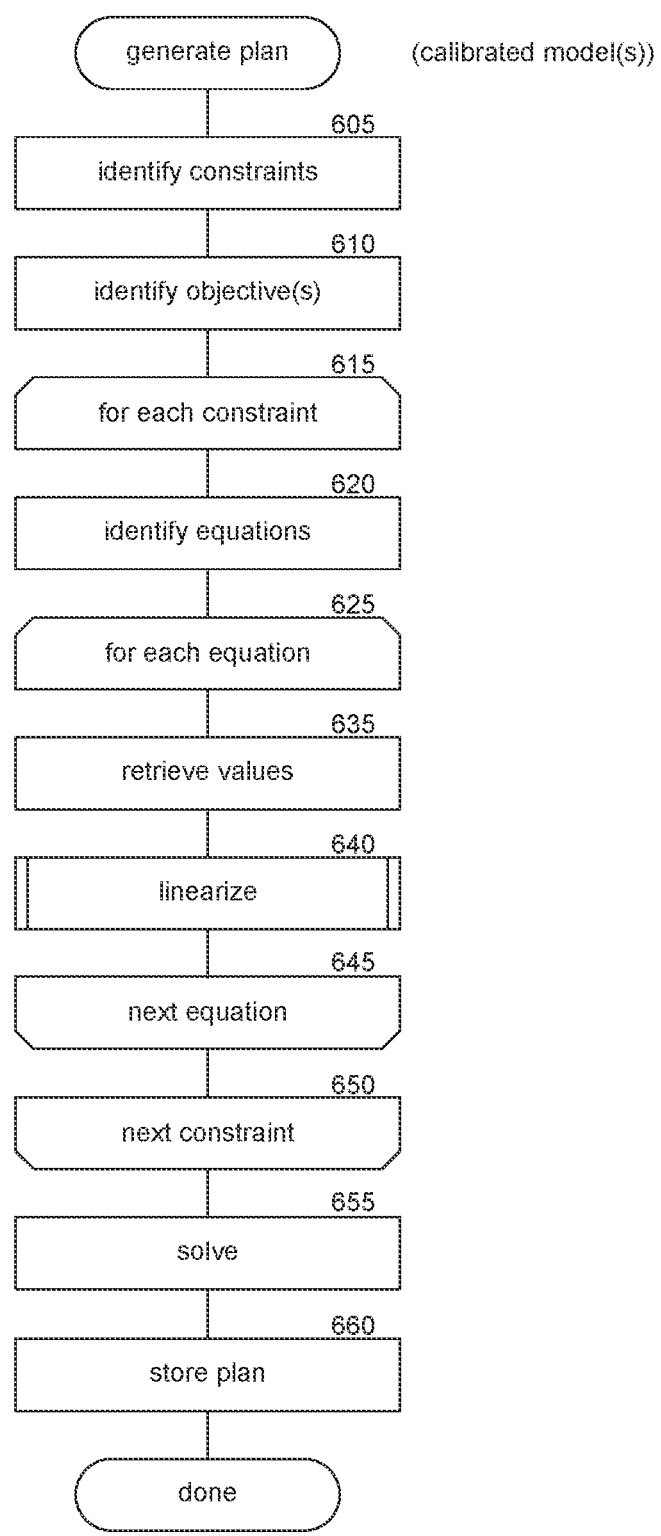
FIG. 6 is a flow diagram illustrating the processing of a generate plan component.

FIG. 6 is a flow diagram illustrating the processing of a generate plan component in accordance with some embodiments of the disclosed technology. The generate plan component is invoked by the facility to generate a set of inputs to an energy system based on one or more calibrated models. The generate plan component identifies a set of inputs that provides the best fit to a corresponding goal or goals in accordance with, in some cases, one or more constraints. In block 605, the component identifies any constraints associated with the plan, such as a user's preferences on energy usage, timing preferences (e.g., keep temperate above 65 degrees between 6 pm and midnight), cost preferences). In block 610, the component identifies any objectives or goals for the plan to be generated, such as reducing or minimizing cost (for a set of constraints), reducing or minimizing energy consumption (consistent with a set of constraints), and so on. In blocks 615-650, the component loops through each of the constraints in order to linearize the constraint. In block 620, the component identifies or generates equations for the constraint representative of 1) susceptibility of the energy system to change conditions due to the engine(s) responsible for driving the conditions within the energy system (e.g., an HVAC system, a battery charger, a pool pump) away from external conditions or toward another state (e.g., how much energy it takes to raise or lower the temperature within a room by one degree, how much energy it takes for an automated vacuum cleaner to clean a portion of a room), 2) drive strength of the engine(s) to change conditions within the energy system (e.g., the rate at which a room warms or cools while an HVAC system is enabled, the rate at which dust particles or dust clumps are removed while an automated vacuum clear is operating), and 3) the entropy rate which measures how quickly the conditions within the energy system tend toward higher entropy in the absence of the engine(s) operating, wherein each condition can be physically constrained or constrained based on user preferences (e.g., the rate at which a building or room warms or cools while an HVAC system is disabled, the rate at which dust particles or dust clumps are created and dispersed within a room using, for example, models based on Brownian motion and particle electrostatics). In some embodiments, equations can be generated once per class of devices, and the coefficients for the equations are determined based upon the identified non-measurable values in the modeling parameters. The equations can be generated based on a calibrated model for the energy system. Each of these equations can change with external conditions, such as time of day, outdoor temperature, weather occupancy, and so on. To calculate the entropy rate, the component simulates an "engine off" circumstance over each set of external conditions for a selected forecast period (e.g., each of 4-6 forecast periods over 24 hours), and then records the rate of change of the conditions of the energy system for each set of external conditions. For example, in the absence of a cooling engine operating at what rate does the temperature in the house rise or fall by one degree? To calculate the drive strength, the facility simulates an "engine on" circumstance at various times and under various conditions to find the "nameplate capacity" of the engine. The facility may find the nameplate capacity by minimizing the error between the simulations and measured data (i.e., smallest error rate between the coefficients used in the linear model and those used the calibrated model). To calculate the susceptibility, the facility simulates an "engine on" circumstance over each set of external conditions, and records the engine energy necessary to change the conditions of the energy system by one unit. For example, when the cooling system is operating, how much energy did it use to lower the temperature by one degree. Susceptibility takes into account both the nameplate capacity of the engine as well as the efficiency of the engine, which may vary with the external conditions. In blocks 625-645, the component loops through each of the generated or identified equations and linearizes the values generated for the constraint. In block 635, the component retrieves the calibrated model values for a forecast period or periods (e.g., forecasted external conditions, measured values, non-measureable values, predictive values, explanatory values). In block 640, the component invokes a linearize component to linearize the measured values. In block 645, the component loops back to block 625 to select the next equation. In block 650, the component loops back to block 615, to select the next constraint. In block 655, the component invokes a linear program, such as a mixed integer linear program using the linearized constraints and the identified objective(s) or goal(s) to produce a set of inputs to the energy system that will result in 1) a plan consistent with the specified constraints and 2) the achieves or approximates the identified objective or goal. In block 660, the component stores the set of inputs as a plan and then completes. In some embodiments, a means for generating a plan comprises one or more computers or processors configured to carry out an algorithm disclosed in FIG. 6 and this paragraph in the order described therein.

Figure 7:
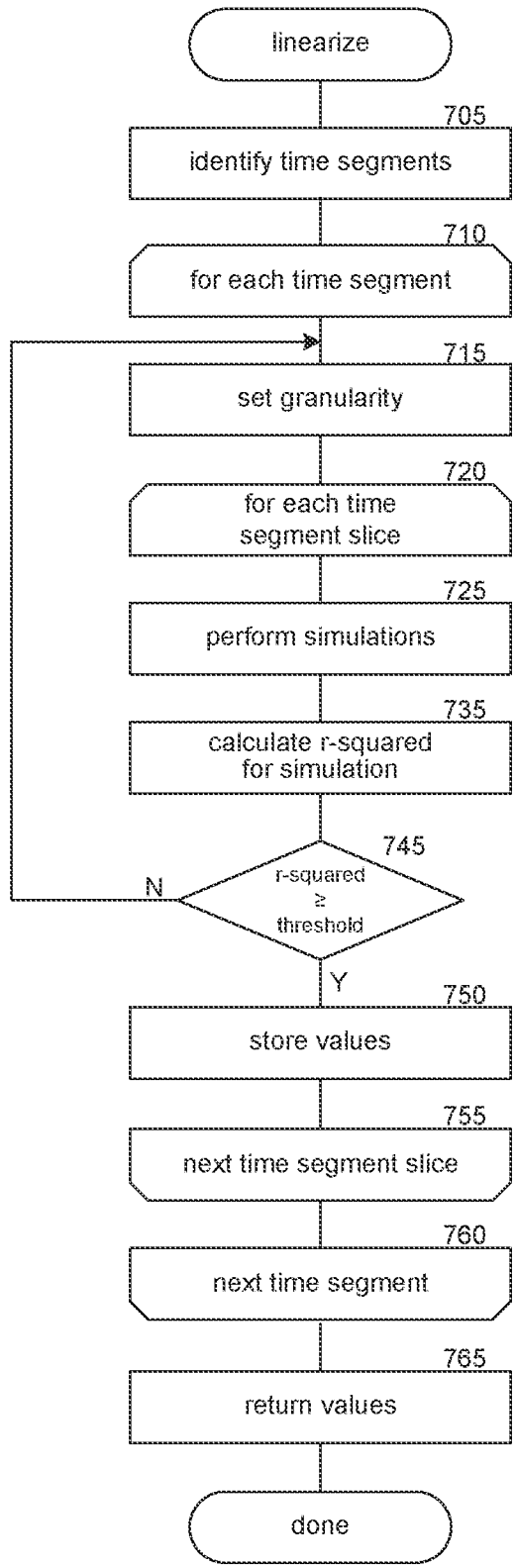
FIG. 7 is a flow diagram illustrating the processing of a linearize component.

FIG. 7 is a flow diagram illustrating the processing of a linearize component in accordance with some embodiments of the disclosed technology. The component invokes the linearize component to linearize a constraint for a given time period. In block 705, the component identifies time segments for the time period. The time segments may be determined, for example, automatically based on the length of the period, using a fixed interval, using a fixed number of segments, using a user-defined value, and so on. In blocks 710-755, the component loops through each of the identified time segments to simulate the performance of the energy system during that time segment based on simulated conditions of the energy system and simulated external conditions that affect the energy system. In block 715, the component sets the granularity for the simulations. The granularity may be determined, for example, automatically based on the length of the segment, using a fixed interval, using a fixed number of segment slices, using a user-defined value, and so on. In blocks 720-755, the component loops through each of the time segment slices. In block 725, the component performs one or more simulations for each time segment slice based on the associated forecasted values and the calibrated model. In some embodiments, the component relies on an error tolerance value to determine how many simulations to perform. In block 735, the component calculates an r-squared value for the simulation based on the simulated values and the values from the calibrated model. In block 735, the component calculates an r-squared value for each simulation based on the simulated values and the measured values. In decision block 745, if the maximum r-squared value calculated for the time segment slice is greater than or equal to a predefined threshold (e.g., 0.2, 0.5, 0.75, 0.99), then the component continues at block 750, else the component loops back to block 715 to adjust the granularity and perform another set of one or more simulations for the time segment slice. In block 750, the component stores the simulated values for the simulation having the greatest r-squared value for the time segment slice. In block 755, the component loops back to block 720 to select the next time slice segment. In block 760, the component loops back to block 710, to select the next time slice. In block 765, the component returns the stored values in the form of coefficients for the currently-selected equation. In some embodiments, a means for linearizing comprises one or more computers or processors configured to carry out an algorithm disclosed in FIG. 7 and this paragraph in the order described therein.

Figure 8:
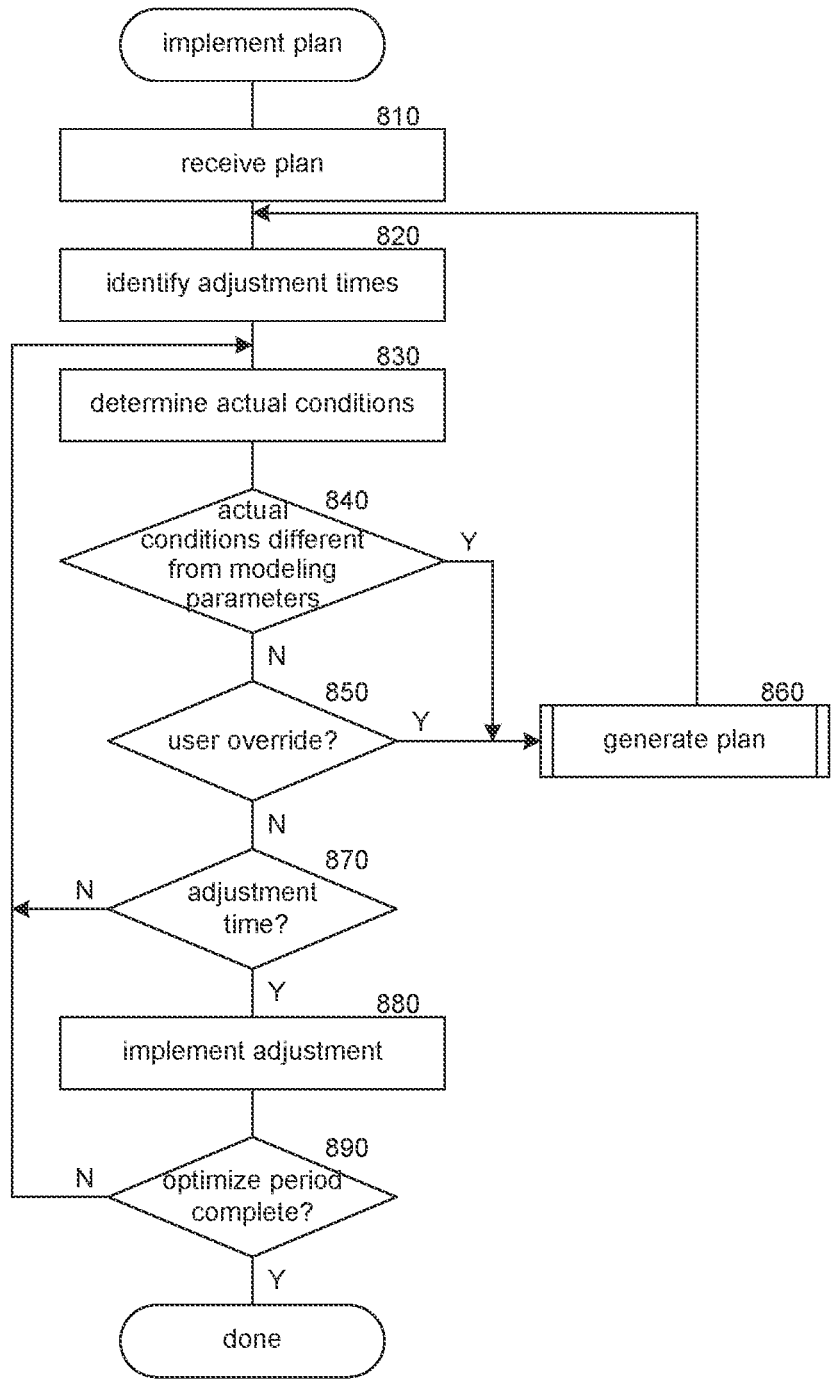
FIG. 8 is a flow diagram illustrating the processing of an implement plan component.

FIG. 8 is a flow diagram illustrating the processing of an implement plan component in accordance with some embodiments of the disclosed technology. The implement plan component is invoked by the facility during the optimization period to implement the simulated inputs in an energy system for which the plan was generated. In block 810, the component receives the plan to be implemented and an indication of the modeling parameter set used to generate the plan to be implemented. In block 820, the component identifies the adjustment times included in the plan, each adjustment time representing a time at which one or more inputs to the energy system are to be adjusted. In block 830, the component determines values for variable conditions, such as the current temperature, occupancy information, and so on. In decision block 840, if the difference between one or more of the determined conditions and the modeling parameter set used to generate the plan, then the component continues at block 860 to generate a new plan based on updated condition information, else the component continues at decision block 850. For example, if the component determines that a modeling parameter set was selected based on a forecasted high temperature of 75° F. but the component determines that the current temperature is greater than 75° F., then the component can generate a new plan based on the updated information. In decision block 850, if a user overrides one of the inputs specified by the plan, then the component continues at block 860 to generate a new plan based on the user's override, else the component continues at decision block 870. In block 860, the component invokes a generate plan component to generate a new plan and then loops back to block 820 to identify adjustment times for the new plan. In 870, if an adjustment time has occurred, then the component continues at block 880, else the component loops back to block 830 to update the values for the variable conditions. In block 880, the component implements the adjustment(s) corresponding to the current adjustment time. In block 890, if the optimization period is complete, then processing of the component completes, else the component loops back to block 830 to update the values for the variable conditions. In some embodiments, a means for implementing a plan comprises one or more computers or processors configured to carry out an algorithm disclosed in FIG. 8 and this paragraph in the order described therein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any of the items in the list all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in the specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method, performed by a computing system, for managing energy consumption within an energy-consuming system during a period, the method comprising:
   determining, by the computing system, environmental conditions for the energy-consuming system, the environmental conditions including, for the energy-consuming system during the period, at least one weather-related value and at least one heating, ventilation, and air conditioning (HVAC)-related value associated with a HVAC component;
   calibrating, by the computing system, at least one of a plurality of models;
   identifying, by the computing system, one or more constraints for the period;
   identifying, by the computing system, one or more objectives for the period;
   determining, for the energy-consuming system,
      susceptibility of the energy-consuming system to change conditions based on at least the weather-related value(s) and the HVAC-related value(s), and
      drive strength of the HVAC component that drives conditions within the energy-consuming system based on at least the weather-related value(s) and the HVAC-related value(s);
   linearizing the susceptibility and the drive strength;
   generating, by the computing system, a control schedule for the energy-consuming system during the period based at least in part on the identified one or more constraints for the period, the identified one or more objectives for the period, the linearized susceptibility, and the linearized drive strength; and
   controlling a heating, ventilation, and air conditioning system in accordance with the generated control schedule.

2. The method of claim 1, further comprising:
   generating a modeling parameter set for the energy-consuming system and storing the generated modeling parameter set.

3. The method of claim 1, further comprising:
   providing the generated control schedule to the energy-consuming system.

4. The method of claim 1, wherein the models include:
   a thermal model, and
   an electrical model.

5. The method of claim 1 wherein the at least one HVAC-related value includes an indoor temperature and/or historical behavior measured through interactions with the energy-consuming system.

6. The method of claim 1 wherein the at least one weather-related value comprises a historical outdoor temperature, a historical outdoor humidity, a historical outdoor wind speed, a historical outdoor air pressure, and/or historical solar irradiance for the energy-consuming system for the period.

7. The method of claim 1 wherein the at least one weather-related value comprises a forecasted outdoor temperature, a forecasted outdoor humidity, a forecasted outdoor wind speed, a forecasted outdoor air pressure, and/or forecasted solar irradiance for the energy-consuming system for the period.

8. The method of claim 1 wherein the determined environmental conditions further comprise:
   at least one occupancy-related value for the energy-consuming system during the period,
   at least one size-related value for the energy-consuming system during the period, or
   any combination thereof.

9. The method of claim 8 wherein the at least one occupancy-related value for the energy-consuming system comprises a day of the week for the period, and wherein the at least one size-related value for the energy-consuming system comprises an area of the energy-consuming system.

10. The method of claim 1, further comprising:
    obtaining, by the computing system, a plurality of generic models representative of energy consumption; and
    identifying, by the computing system, a modeling parameter set for the period,
    wherein the calibrating comprises calibrating at least one of the obtained generic models representative of energy consumption based at least in part on the selected modeling parameter set for the period.

11. The method of claim 1 wherein at least one of the identified objectives is a user-specified objective.

12. The method of claim 1, further comprising:
    performing a plurality of simulations, wherein each simulation generates a plurality of simulated input values to the calibrated at least one model and a plurality of simulated responses to the simulated input values; and
    optimizing, by the computing system, the simulated input values generated for a prediction quantity by the performed simulation.

13. The method of claim 12 wherein optimizing the simulated input values generated for the prediction quantity comprises linearly optimizing the simulated input values generated for the prediction quantity by the performed simulation.

14. A computer-readable storage medium storing instructions that, if executed by a computing system, cause the computing system to perform a method for managing energy within an energy system over a period, the method comprising:
    determining, by the computing system, environmental conditions for the energy-consuming system, the environmental conditions including, for the energy-consuming system during the period, at least one weather-related value and at least one heating, ventilation, and air conditioning (HVAC)-related value associated with a HVAC component;
    calibrating, by the computing system, at least one of a plurality of models;
    identifying, by the computing system, one or more constraints for the period;
    identifying, by the computing system, one or more objectives for the period;
    determining, for the energy-consuming system,
       susceptibility of the energy-consuming system to change conditions based on at least the weather-related value(s) and the HVAC-related value(s), and
       drive strength of the HVAC component that drives conditions within the energy-consuming system based on at least the weather-related value(s) and the HVAC-related value(s);
    linearizing the susceptibility and the drive strength;
    generating, by the computing system, a control schedule for the energy-consuming system during the period based at least in part on the identified one or more constraints for the period, the identified one or more objectives for the period, the linearized susceptibility, and the linearized drive strength; and controlling a heating, ventilation, and air conditioning system in accordance with the generated control schedule.

15. The computer-readable storage medium of claim 14, the method further comprising:
controlling one or more end-user devices in accordance with the generated control schedule.

16. The computer-readable storage medium of claim 15 wherein the one or more end-user devices comprise at least one thermostat.

17. The computer-readable storage medium of claim 14 wherein calibrating at least one of a plurality of models includes calibrating a thermal model, wherein calibrating the thermal model comprises:
identifying one or more modeling parameter sets based at least in part on forecasted environmental conditions and environmental conditions associated with the modeling parameter sets.

18. The computer-readable storage medium of claim 14, further comprising:
simulating a plurality of outputs from the energy system at least in part by invoking a particle swarm optimization simulator.

* * * * *